United States Patent [19]

Norby et al.

[11] Patent Number: 5,478,790
[45] Date of Patent: Dec. 26, 1995

[54] BLOCKED TIN CATALYST SYSTEM FOR USE WITH MERCAPTO RESIN/ACRYLIC RESIN BLENDS

[75] Inventors: David B. Norby; Kimberly S. Baker, both of Columbus, Ohio

[73] Assignee: Ashland Oil, Inc., Ashland, Ky.

[21] Appl. No.: 230,087

[22] Filed: Apr. 20, 1994

[51] Int. Cl.$^6$ ..................................................... B01J 23/00
[52] U.S. Cl. ...................... 502/300; 502/168; 502/216; 502/242; 502/349; 502/353; 528/55; 528/58
[58] Field of Search .................. 427/340, 385.5; 502/152, 155, 156, 168, 169, 170, 216, 242, 300, 349, 353; 521/118, 121; 528/55, 58

[56] References Cited

U.S. PATENT DOCUMENTS

| | | | |
|---|---|---|---|
| 4,517,222 | 5/1985 | Blegen | 427/385.5 X |
| 4,753,825 | 6/1988 | Linden et al. | 427/340 |
| 4,788,083 | 11/1988 | Dammann et al. | 427/340 |

*Primary Examiner*—Michael Lusignan
*Attorney, Agent, or Firm*—Mueller and Smith

[57] ABSTRACT

In its broadest aspects, the present invention is directed to a tin or bismuth catalyst/mercapto complex as disclosed in U.S. Pat. No. 4,788,083 which catalyst complex exhibits substantially the same stability and activity after extended periods of storage as it exhibits upon initial formation. Such long term storage stability is achieved by restricting the vehicle for the catalyst complex to one that will not react with said mercapto compound upon extended storage of said catalyst system. Advantageous such vehicles include aromatic hydrocarbons and terpenes. Importantly, ketone vehicles are excluded from the catalyst complex formulation. Preferred vehicles include toluene, xylene, turpentine, d-limonene, aromatic petroleum distillates, and mixtures thereof. Corresponding method for forming the stabilized catalyst complex forms yet further aspect of the present invention. As another aspect of the present invention, the present invention is directed to polymercapto resin/polyisocyanate formulations as disclosed in U.S. Pat. No. 4,753,825 which are more stable by dint of the elimination of ketonic and like vehicles that are involved in unintended side reactions with the mercapto content thereof. As a further aspect of the present invention, the cure rate of such polymercapto resin/polyisocyanate formulations can be retarded to commercially accepted levels by blending acrylic resins therewith. Advantageously, the stabilized tin catalyst complexes can be used in the instant controlled cure rate polymercapto resin/polyisocyanate formulations.

52 Claims, No Drawings

BLOCKED TIN CATALYST SYSTEM FOR USE WITH MERCAPTO RESIN/ACRYLIC RESIN BLENDS

BACKGROUND OF THE INVENTION

The present invention relates to tin or bismuth catalysts useful in the cure of polyol/polyisocyanate reaction mixtures and more particularly to improving the long-term storage stability of such catalysts in the form of a complex with an excess of mercapto compound and to the use of such catalyst systems with mercapto resin/acrylic resin blends for cure with, for example, vaporous tertiary amines.

In the polyurethane coatings field, for example, catalyzed aliphatic urethane coating systems having both extended open times and fast "on demand" or "trigger" cures have been realized by the utilization of mercapto complexing agents to block the activity of a tin or bismuth catalyst. As described by Dammann, et al. in U.S. Pat. No. 4,788,083, the disclosure of which is expressly incorporated herein by reference, such complexed catalysts remain essentially inactive until unblocked in the presence of an amine catalyst or heat. Though the addition of organic solvents to disperse the catalyst complex was described by Dammann, et al., only methyl amyl ketone is reported in the examples.

In commercial practice the Dammann, et al. complex catalyst is quite stable for storage times of ranging up, say, about 8 months, depending upon formulation ingredients, storage conditions, and like factors. However, manufacture of larger batches for shipment of the catalyst complex overseas necessitated longer storage times. Catalyst complex stability emerged as a roadblock to such long term storage. Degradation of the catalyst complex was linked to the formation of hemimercaptals and mercaptals as determined by NMR analysis.

Thus, it was postulated that catalyst complex instability was due to an unintended side reaction of excess mercapto compound with the solvent, notably ketone and acetate solvents. As excess mercapto compound was consumed by the solvent over a period of time, the catalyst complex became unstable, i.e., reactive, due to the excess mercapto presence being depleted. Accordingly, it was apparent that a formulation change was in order so that long term storage of the catalyst complex could be implemented.

Aliphatic urethane coating systems curable with vaporous amine catalyst have been described in U.S. Pat. No. 4,517,222 which is an improvement on so-called chamber cure systems such as described in, for example, U.S. Pat. No. 4,753,825. Subsequently, polymercapto resins were developed for cure with such vaporous amine catalyst method, as described in U.S. Pat. No. 4,753,825. The foregoing catalyst complexes also can be used to cure the polymercapto resins of the '825 patent. Use of polymercapto resins enables the use of all-aliphatic isocyanate curing agents and results in coatings with unusually high gloss. However, such resins actually have been found to be too reactive for commercial use. Further, it now has been determined that ketonic and other carbonyl solvents in the formulation also react unintendedly with the polymercapto resins. Thus, it is apparent that there is a need to modify polymercapto resin systems to minimize unintended side reaction with solvents used and to enable their use in commercial settings. The foregoing patents are expressly incorporated herein by reference.

SUMMARY OF THE INVENTION

In its broadest aspects, the present invention is directed to a tin or bismuth catalyst/mercapto complex as disclosed in U.S. Pat. No. 4,788,083 which catalyst complex exhibits substantially the same stability and activity after extended periods of storage as it exhibits upon initial formation. Such long term storage stability is achieved by restricting the vehicle for the catalyst complex to one that will not react with said mercapto compound upon extended storage of said catalyst system. The vehicle can be volatile or non-volatile. Advantageous such volatile vehicles include aromatic hydrocarbon and terpene solvents. Importantly, ketonic vehicles are excluded from the catalyst complex formulation. Preferred volatile vehicles include, for example, toluene, xylene, turpentine, d-limonene, aromatic petroleum distillates, and mixtures thereof. Corresponding method for forming the stabilized catalyst complex forms yet further aspect of the present invention. Non-volatile solvents can be reactive, i.e., react under curing conditions of the formulation. Alternative, non-volatile solvents can remain unreactive under the chosen conditions of cure, e.g., plasticizers.

As another aspect of the present invention, the present invention is directed to polymercapto resin/polyisocyanate formulations as disclosed in U.S. Pat. No. 4,753,825 which are more stable by dint of the elimination of ketonic and like vehicles that are involved in unintended side reactions with the mercapto content thereof. As a further aspect of the present invention, the cure rate of such polymercapto resin/ polyisocyanate formulations can be retarded to commercially accepted levels by blending acrylic resins therewith. Advantageously, the stabilized tin catalyst complexes can be used in the instant controlled cure rate polymercapto resin/ polyisocyanate formulations.

Advantages of the present invention include the formulation of more stable catalyst complexes than were heretofore manufactured. Another advantage is the ability for catalyst complex manufacturer to formulate large batches thereof for shipment all over the world while preserving its stability and activity with ultimate use being up to a year or more after manufacture. Another advantage is that the activity of the stabilized catalyst complex is not compromised at the expense of achieving long term storage. A further advantage are more stabilized polymercapto resin/polyisocyanate formulations which can be used with the novel catalyst complexes. These and other advantages will be readily apparent to those skilled in the art based upon the disclosure herein.

DETAILED DESCRIPTION OF THE INVENTION

Referring initially to the polymercapto compounds for use as a reactant in the coating formulation or to complex with the tin or bismuth catalysts, a variety of mono-functional and poly-functional mercaptans can be used to advantage in accordance with the precepts of the present invention. Representative mercaptans include, for example, trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, alpha, alpha'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, various mercapto pyridines, dithioerythritol, 6-ethoxy-2-mercaptobenzothiazole, d-limonene dimercaptan, 2,3-dithioglycerine, and the like and mixtures thereof. Further useful mercaptans can be found in various catalogs of commercially-available mercaptans.

Additionally, a variety or monofunctional and polyfunctional mercaptan monomers, oligomers, and polymers can be synthesized or modified to contain pendant mercaptan or thiol groups in accordance with the '083 patent. Those skilled in the art will appreciate the techniques required for such compound formation and little more concerning this aspect of the invention need be set forth herein.

The details of the tin or bismuth catalyst complex formed with excess mercapto compound are set forth in U.S. Pat. No. 4,788,083, cited above. Referring to the tin catalysts, a variety of conventional tin catalysts can be used advantageously in the inventive catalyst system. Conventional tin catalysts include, for example, di-alkyl tin carboxylates such as dibutyltin dicarboxylates (e.g. dibutyltin dioctoate, stannous octoate, stannous acetate, di-n-butyl tin dilaurate, tri-n-butyl tin acetate, stannous oxylate, stannous titrate, and the like), tin mercaptides (e.g. dibutyltin dilaurylmercaptide), stannic oxide, stannous chloride, stannic chloride, tetra-phenyl tin, tetra-butyl tin, dimethyl tin dichloride, 1:1 Harada complex of a dialkyl tin dicarboxylate and a dialkyl tin oxide catalyst, and the like and even mixtures thereof. It is conceivable that certain tin catalysts and certain mercaptans may not form as effective complexes as is desirable due to steric hindrance. Still, it is believed that a usable complex can be formed from most tin catalysts and most mercaptans.

A variety of conventional bismuth catalysts also can be used to advantage in the present invention. Conventional bismuth catalysts include, for example, bismuth tricarboxylates (e.g. acetates, oleates, etc.), basic bismuth dicarboxylates (e.g. bismuthyl bis-neodecanoate, bismuth subsalicylate, bismuth subgallate, etc.), bismuth nitrate, bismuth halides (e.g. bromide, chloride, iodide, etc.), bismuth sulfide, and the like and mixtures thereof.

The polyisocyanate used to prepare the curable formulations can be chosen from a wide variety of aromatic, aliphatic, or cycloaliphatic isocyanates having, on average, two or more isocyanate groups per molecule. These polyisocyanates include, for example, methylene diphenyl isocyanate (MDI), toluene diisocyanate (TDI), xylylene diisocyanate (XDI), polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof. Reference is made to the '222, '083, and '825 patents cited above for further discussion of such polyisocyanate compounds.

Representative ingredients forming the acrylic resins for inclusion in the curable formulations disclosed herein include, for example, reactive vinyl monomers such as the lower alkyl esters of acrylic and methacrylic acids or polymers or prepolymers thereof. Vinyl monomers particularly adapted for photopolymerization include, for example, methyl methacrylate, ethyl methacrylate, 2-ethyl hexyl methacrylate, butyl acrylate, isobutyl methacrylate; the corresponding hydroxy acrylates, e.g., hydroxy ethyl acrylate, hydroxy propyl acrylate, hydroxy ethyl hexyl acrylate; also the glycol acrylates, e.g. ethylene glycol dimethacrylate, hexamethylene glycol dimethacrylate; the allyl acrylates, e.g. allyl methacrylate, diallyl methacrylate; the epoxy acrylates, e.g. glycidyl methacrylate; and the aminoplast acrylates, e.g. melamine acrylate. Other ingredients include diallylphthalate, vinyl acetate, vinyl and vinylidene halides, N-vinyl pyrrolidone, and amides, e.g. methyl acrylamide, acrylamide, diacetone acrylamide, butadiene, styrene, vinyl toluene, and the like, and mixtures thereof. Specific preferred acrylic resins include, for example, Desmophen A-450 and A-160 resins available from Miles, Inc.. A wide variety of additional acrylic resinous compounds may be used in accordance with the precepts of the present invention as those skilled in the art will appreciate.

To make the catalyst complexes of the present invention, the ingredients simply need to be mixed, advantageously at room temperature, although higher temperatures can be used as necessary, desirable, or convenient, at the expense of increased odor from the mercapto complexing agent. While it is possible that the vehicle for the tin/mercapto complex can be the excess mercapto complexing agent, it has been determined that excess mercapto compound appears to have an adverse effect on exterior durability, not to mention its odor and relatively high cost. Thus, use of a non-keto organic vehicle is disclosed herein. Suitable such volatile vehicles include, for example, aromatic hydrocarbons and terpenes. Preferred such volatile vehicles include, for example, toluene, xylene, turpentine, d-limonene, aromatic petroleum distillates, and the like and mixtures thereof. Alternatively, non-volatile vehicles include, for example, polyether polyols (e.g., block polyethylene and polypropylene oxide homo-and co-polymers ranging in molecular weight from about 300 to about 3,000) optionally alkylated (e.g., polytetramethylene ether glycols), caprolactone-based polyols, and the like.

It should be understood that the carbonyl compounds to be avoided include "solvents", as such term is used in the paint field. Not necessarily to be excluded are ketone-based chelating agents, such as are described at column 10 of the '083 patent. Keto chelating agents impart stability to metal catalysts based on their ability to complex or chelate with metal ions. The present invention, however, is directed to vehicles that are used in the formation of the mercapto catalyst complexes wherein non-carbonyl based vehicles have unexpectedly have been determined to improve stability of the mercapto metal catalyst complexes.

With respect to the proportions of catalyst system, the proportion of tin or bismuth catalyst should be adjusted to be in an effective catalytic amount for the polyol/polyisocyanate reaction. Typically, this translates into active tin/bismuth catalyst concentration levels ranging from about 0.0001 to about 1.0 weight percent. The proportion of mercaptan generally is adjusted to be substantially in excess of the proportion of tin/bismuth catalyst. At higher complexing agent/metal catalyst ratios, better stability (pot life) is observed. At a given ratio, higher metal catalyst levels provide faster cure, but shorter pot life. Catalyst/complexing agent ratios will vary depending upon the particular tin or bismuth catalyst, the particular mercaptan, the polyol and polyisocyanate of choice, and the performance requirements desired. Generally, however, complexing agent metal content of the catalyst mole ratios ranging from about 2:1 to 500:1 have been found to be useful in the catalyzed reaction mixture, as discussed above.

Polyols and polyisocyanates useful in forming reactive mixtures for polyurethane formation also are well known in the art and adequately detailed in the '083 patent. Accordingly, aromatic, aliphatic, and mixed aromatic/aliphatic polyols and polyisocyanates can be used in the formation of reactive mixtures. Additives and like ingredients also are conventional.

Cure of the catalyzed polyurethane-forming reaction mixtures can be accomplished by heat and/or use of amine activators as detailed in the '083 patent. Substrates to be coated and techniques for substrate coating and cure also are well known in this art.

The following examples show how the present invention can be practiced, but should not be construed as limiting. In this application, all proportions and percentages are by weight and all units are in the metric system, unless otherwise expressly noted. Also, all citations are expressly incorporated herein by reference.

EXAMPLES

EXAMPLE I

A standard polyol/polyisocyanate formulation was compounded from the following ingredients.

TABLE I

| Base 120 | | |
|---|---|---|
| Ingredient | Type* | Amount (wt parts) |
| Polyol | Desmophen XP-631 | 36.7 |
| Polyisocyanate | Tolonate HDT-90 | 31.9 |
| Vehicle | Methyl Amyl Ketone | 31.4 |

*Desmophen XP-631 is a saturated polyester resin supplied in propylene glycol monomethyl ether acetate; solids 75 + 2 wt-%; 200–220 hydroxyl number, 3.0 max. acid number; Gardner color No. 1 max.; 10,000–25,000 mPa viscosity at 25° C.; 267 equivalent wt. avg.; 1.1 sp. g. at 25° C.; Mobay Corporation, Pittsburgh, PA.
Tolonate HDT-90 is an aliphatic polyisocyanate solution (1:1 butyl acetate/Solvesso 100); 1.12 g/cc bulk density at 25° C.; 41° C. flash point (closed cup); 210 g equivalent weight; 90 ± 1% polyisocyanate content; 550 ± 150 mPas viscosity at 25° C.; 20 ± 1% NCO content; Rhone-Poulenc Inc. Monmouth Junction, NJ.

Various tin catalyst complexes were compounded as follows:

TABLE II*

| Ingredient | VIC 5054 (wt-%) | VIC 6008 (wt-%) | VIC 5075 (wt-%) |
|---|---|---|---|
| Glycol Dimercapto Propionate | 30.00 | 3.33 | 30.00 |
| Dibutyl Tin Dilaurate | 3.33 | 1.11 | 3.33 |
| Methyl Amyl Ketone | 33.33 | — | — |
| n-Butyl Acetate | 33.34 | — | — |
| Pentane 2,4-Dione | — | 95.56 | — |
| Aromatic 100 | — | — | 66.67 |

*VIC is a registered trademark of Ashland Chemical, Inc., Dublin, OH 43017

The following catalyzed reaction mixtures then were formulated and evaluated.

TABLE III

| Formulation | Mix 1 (wt-%) | Mix 2 (wt-%) | Mix 3 (wt-%) |
|---|---|---|---|
| Base 120 | 100.0 | 100.0 | 100.0 |
| VIC 5054 - 9 months storage | 0.3 | — | — |
| VIC 5075 - 8 months storage | — | 0.3 | — |
| VIC 5075 - 12 days storage | — | — | 0.3 |
| Viscosity (sec)* | | | |
| Immediate | 57 | 57 | 57 |
| After 4 hours | Fluid | Fluid | Fluid |
| After 5.5 hours | Gel | Fluid | Fluid |
| After 6 hours | — | 115 | 119 |
| After 7 hours | — | 270 | 253 |
| After 8 hours | — | Gel | Gel |

*Viscosity measured with #2 spindle at 60 rpm.

These results demonstrate that the tin catalyst complex with ketonic vehicle had degraded after 8 months to an extent that stability of the resulting catalyzed reaction mixture was limited to around 4 hours. The tin catalyst complexes having no ketonic vehicle, however, remained stable in the catalyzed reaction mixture up to almost 8 hours. Such stability is demonstrated even though one of the tin catalyst complex samples was 8 months old. Note, that both the fresh and old tin catalyst complex samples appeared to exhibit about the same stability in the catalyzed reaction mixtures. Thus, the replacement of ketonic vehicle with non-ketonic vehicle has resulted in improved catalyst stability even upon extended storage thereof.

EXAMPLE II

An additional sample of VIC 5075 tin catalyst complex (sample 2347L) was compounded and stored at ambient indoor room temperature for 8 months. Thereafter, the aged catalyst complex (0.6 wt-pts) was mixed with Base 120 (200 wt-pts) and viscosity measurements taken as described in Example I. The following results were recorded.

TABLE III

| Time After Mixing (hrs) | Viscosity (sec.) |
|---|---|
| Initial | 53 |
| 2 | 54 |
| 4 | 61 |
| 6 | 70 |
| 7 | 77 |

Again, the stability and activity of the tin catalyst complex is demonstrated to be maintained even after 8 months of storage.

EXAMPLE III

A white paint was compounded from the ingredients set forth below.

TABLE IV

| Ingredients* | Amount (wt-%) |
|---|---|
| PART A (EP 5120044-61) | |
| Desmophen 631 A-75 | 42.27 |
| BYK-141 | 0.34 |
| Methyl Isobutyl Ketone | 8.59 |
| MPA-60X | 0.34 |
| R-960 TiO$_2$ Pigment | 34.36 |
| Fluorad FC-430 | 0.09 |

TABLE IV-continued

| Ingredients* | Amount (wt-%) |
|---|---|
| Propyl Methoxy Acetate | 12.03 |
| Xylene | 1.98 |
| | 100% |
| PART B (EP 51200-EN) | |
| Desmodur N3200 | 57.14 |
| n-Butyl Acetate | 42.86 |
| | 100% |

*Desmophen 631 A-75 polyol, Niles, Inc.
BYK-141 defoamer, Byk Chemie USA
MPA-60X anti-settling agent, NL Industries
R-960 white titanium dioxide pigment, DuPont
Fluorad FC-430 surfactant from 3M Company
Desmodur N3200 aliphatic polyisocyanate, Miles, Inc.

This high gloss white enamel was formed by making a pigment grind from the Part A ingredients and then adding the Part B ingredients. Batches of the white enamel were made without any catalyst, with standard tin catalyst, and with the inventive catalyst system. The batches were tested for pot life. Next, each batch was spray applied and cured according to the vapor injection process of U.S. Pat. No. 4,517,222 using vaporous dimethyl ethanol amine catalyst. The cured coatings then were tested for pencil hardness. The formulations of the batches and test results recorded are set forth below.

TABLE V

| | No Catalyst | Standard Tin Catalyst | | Tin Catalyst Complex | |
|---|---|---|---|---|---|
| BATCH (wt-parts) | 1 | 4 | 5 | 2 | 3 |
| Part A | 126 | 126 | 126 | 126 | 126 |
| VIC 5075 Catalyst | — | — | — | .9 | 1.8 |
| T-12 Catalyst* | — | .3 | .6 | — | — |
| Part B | 70 | 70 | 70 | 70 | 70 |
| Total | 196 | 196.3 | 196.6 | 196.9 | 197.8 |
| POT LIFE VISCOSITY (#2 Zahn ,cup, cps) | | | | | |
| Initial | 24 | 23 | 23 | 23 | 23 |
| After 30 min. | 24 | 24 | Gel | 24 | 24 |
| After 1 Hr. | 24 | Gel | — | 25 | 25 |
| After 3 Hr. | 25 | — | — | 26 | 27 |
| After 5 Hr. | 27 | — | — | 27 | 28 |
| After 8 Hr. | 27 | — | — | 36 | 35 |
| CURE RATE (pencil hardness) | | | | | |
| After 2 Hr. | Still Transfers | 4B | 2B | 6B | 4B |
| After 4 Hr. | Still Transfers | B | F | B | HB |
| After 6 Hr. | No Transfer <6B | F | F | HB | F |
| After 48 Hrs. | 2H | 2H | 2H | 2H | 2H |

*10% solution of Metacure T-12 brand dibutyl tin dilaurate catalyst, Air Products Company The above-tabulated data clearly establishes the increased stability that the inventive catalyst system imparts, while maintaining performance of the cured coating composition.

EXAMPLE IV

In order to demonstrate the efficacy of blending acrylic polyol resins with mercapto resins for providing a commercially usable curable formulation, which also is deplete in ketonic vehicle, the following formulations were compounded:

TABLE VI

| Ingredient | Type* | Gloss (wt-pts) | Matte (wt-pts) |
|---|---|---|---|
| Acrylic Resin | Desmophen A-450 | 51.5 | 51.5 |
| Acrylic Modifying Resin | Polytex 9017 | 1.0 | 1.0 |
| Wax | Polymist B-6 | 1.1 | 2.0 |
| Vehicle | Xylene | 15.1 | 15.1 |
| | d-Limonene | 0.7 | 0.7 |
| | n-Butyl Acetate | 13.8 | 13.8 |
| Flatting Agent | Silica TS-100 | — | 6.3 |
| Mercapto Compound | Pentaerythritol tetra-(3-mercapto propionate) | 17.1 | 17.1 |
| Catalyst | VIC 5075 | 0.2 | 0.2 |
| Polyisocyanate | Tolonate HDT-90 | ?? | ?? |

Desmophen A-450 is an acrylic polyol, Miles, Inc., Pittsburgh, PA.
Polytex 9017 acrylic polyol, Shell Chemical Co., Lisle, IL.
Polymist B-6 micronized polyethylene wax, Allied-Signal, Inc., Morristown, NJ.
Silica TS-100 silica pigment, Degussa Corp., Ridgefield Park, NJ.

The foregoing formulations had a working pot life of about 8 hours and cured in a VPC chamber containing 2% triethyl amine (TEA) in about 15 seconds. Without the acrylic resins, the formulation could not be pigmented and could not be spray applied under the '222 patent.

EXAMPLE V

The following formulation evidences good stability and is sprayable under the '222 patent.

TABLE VII

| Ingredient | Type* | Amount (wt parts) |
|---|---|---|
| PART A (5418-121-5) | | |
| Acrylic Resin | Desmophen A-450 | 51.5 |
| Mercapto Compound | Pentaerythritol tetra-(3-mercapto propionate) | 17.1 |
| Hindered Antine | Tinuvin CGL- 123 | 0.9 |
| UV Stabilizer | Tinuvin 1130 | 0.9 |
| Vehicle | Xylene | 12.1 |
| | n-Butyl Acetate | 13.8 |
| | d-Limonene | 1.7 |
| | Ethyl 3-Ethoxy Propionate | 2.0 |
| PART B (5418-121-5) | | |
| Polyisocyanate | Tolonate HDT-90 | 69.0 |
| Polyisocyanate | Vestanat T1890L | 31.0 |

Tinuvin CGL-123 hindered amine light stabilizer, Ciba-Geigy Co.
Tinuvin 1130 ultraviolet (UV) light absorber, Ciba-Geigy Co..
Vestanat T189O Lisophorone diisocyanate (IPDI) prepolymer, Hals America, Inc.

The foregoing formulation has a pot life (mixture of Parts A and B) of about 8 hours. When spray applied as described in the '222 patent, the coating is dry to the touch and can be sanded after about 10 minutes when applied to a wood substrate.

EXAMPLE VI

The mercapto tin complex catalyst was dispersed in two non-volatile vehicles: PPG 2000 polyoxypropylene glycol (2000 avg. molecular weight, 56 avg. OH no., Olin Chemicals, Stamford, Conn.), and diisobutyl adipate. The PPG 2000 is reactive in a polyol/polyisocyanate formulation while the diisobutyl adipate functions as a plasticizer. Neither of these vehicles are volatile under curing conditions used in this example and thus, enable the formulation of 100% solids compositions. The catalyst complexes formulated are set for below.

TABLE VIII*

| Ingredient | 5418-070-1 (wt-%) | 5418-070-2 (wt-%) |
|---|---|---|
| Glycol Dimercapto Propionate | 30.0 | 30.0 |
| Dibutyl Tin Dilaurate | 3.3 | 3.3 |
| PPG 2000 | 66.7 | — |
| Diisobutyl Adipate | — | 66.7 |

The following catalyzed reaction mixtures then were formulated and evaluated.

TABLE IX

| Formulation | 5418-070-3 (wt-%) | 5418-070-4 (wt-%) | 5418-070-5 (wt-%) |
|---|---|---|---|
| Base 120 | 100.0 | 100.0 | 100.0 |
| 5418-070-1 Catalyst Complex | 0.5 | — | — |
| 5418-070-2 Catalyst Complex | — | 0.5 | — |
| VIC 5075 (Sample 2347L-Ex. 2) | — | — | 0.5 |
| Viscosity (sec)* | | | |
| Immediate | 60 | 59 | 59 |
| After 1 hours | Fluid | Fluid | Fluid |
| After 3 hours | 72 | 71 | 77 |
| After 4 hours | 82 | 82 | 117 |
| After 5 hours | 111 | 122 | 890** |
| After 6 hours | 211 | 346 | Gel |

*Viscosity measured with #2 spindle at 60 rpm.
**Viscosity measured with #4 spindle at 60 rpm.

These results once again demonstrate that the use of non-ketonic vehicles leads to improved stability of the catalyst complex and formulations containing the catalyst complex. Here, such results were realized using non-volatile vehicles, one which is reactive and once which is not.

EXAMPLE VII

In this example, the two inventive catalyst complexes in Example VI were stored for 13 months and then compared to the VIC 5075 catalyst of Example 1 stored for 17 months and the VIC 5054 catalyst of Example 1 stored for 18 months. The following results were recorded.

TABLE X

| Ingredient | 5624-14-1 (wt-parts) | 5624-14-2 (wt-parts) | 5624-14-3 (wt-parts) | 5624-14-4 (wt-parts) |
|---|---|---|---|---|
| Base 120 | 200.0 | 200.0 | 200.0 | 200.0 |
| 5418-70-1 Catalyst | 0.6 | — | — | — |
| 5418-70-2 Catalyst | — | 0.6 | — | — |
| VIC 5075 Catalyst | — | — | 0.6 | — |
| VIC 5054 Catalyst | — | — | — | 0.6 |
| Viscosity (sec)* | | | | |
| Immediate | 56 | 56 | 56 | 56 |
| After 1 hour | 60 | 59 | 59 | 64 |
| After 2 hours | 62 | 61 | 62 | 95 |
| After 4 hours | 65 | 65 | 67 | 232 |
| After 6 hours | 73 | 73 | 105 | Gel |
| After 8 hours | 94 | 92 | 638 | — |

*Viscosity measured with #2 spindle at 60 rpm.

These results again demonstrate the ability to formulate 100% solids catalysts while still garnering improved pot stability.

We claim:

1. In a coating formulation curable with heat or amine and containing one or more of a polyol or polymercapto resin, a polyisocyanate cross-linking agent, and organic vehicle, and a tin or bismuth catalyst complexed with a molar excess of a mercapto compound, the improvement which comprises said organic vehicle restricted to a non-carbonyl vehicle that will not react with said polymercapto resin or said mercapto compound upon extended storage of said catalyst complex.

2. The coating formulation of claim 1, wherein said catalyst complex is dispersed in a second organic vehicle which is restricted to a non-carbonyl vehicle that will not react with said polymercapto resin or said mercapto compound upon extended storage of said catalyst system.

3. The coating formulation of claim 1, wherein said non-carbonyl vehicle is one or more of an aromatic hydrocarbon or a terpene.

4. The coating formulation of claim 3, wherein said non-carbonyl vehicle is one or more of toluene, xylene, turpentine, d-limonene, or aromatic petroleum distillates.

5. The coating formulation of claim 1, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

6. The coating formulation of claim 2, wherein said catalyst complex is dispersed in a second organic vehicle which is restricted to a non-carbonyl vehicle that will not react with said polymercapto resin or said mercapto compound upon extended storage of said catalyst system.

7. The coating formulation of claim 2, wherein said non-carbonyl vehicle is one or more of an aromatic hydrocarbon or a terpene.

8. The coating formulation of claim 7, wherein said non-carbonyl vehicle is one or more of toluene, xylene, turpentine, d-limonene, or aromatic petroleum distillates.

9. The coating formulation of claim 2, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

10. In method for making a coating formulation curable with heat or amine and containing one or more of a polyol or polymercapto resin, a polyisocyanate cross-linking agent, and organic vehicle, and a tin or bismuth catalyst complexed with a molar excess of a mercapto compound, the improvement which comprises restricting said organic vehicle to a non-carbonyl vehicle that will not react with said polymercapto resin or said mercapto compound upon extended storage of said catalyst.

11. The method of claim 10, wherein said catalyst complex is dispersed in a second organic vehicle which is restricted to a non-carbonyl vehicle that will not react with said polymercapto resin or said mercapto compound upon extended storage of said catalyst system.

12. The method of claim 10, wherein said non-carbonyl vehicle is one or more of an aromatic hydrocarbon or a terpene.

13. The method of claim 12, wherein said non-carbonyl vehicle is one or more of toluene, xylene, turpentine, d-limonene, or aromatic petroleum distillates.

14. The method of claim 10, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

15. The method of claim 11, wherein said catalyst complex is dispersed in a second organic vehicle which is restricted to a non-carbonyl vehicle that will not react with said polymercapto resin or said mercapto compound upon extended storage of said catalyst system.

16. The method of claim 11, wherein said non-carbonyl vehicle is one or more of an aromatic hydrocarbon or a terpene.

17. The method of claim 16, wherein said non-carbonyl vehicle is one or more of toluene, xylene, turpentine, d-limonene, or aromatic petroleum distillates.

18. The method of claim 11, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

19. The method of claim 11, wherein said tin catalyst is one or more of dialkyl tin carboxylates, tin mercaptides, stannic oxide, stannous chloride, stannic chloride, tetraphenyl tin, tetra-butyl tin, dimethyl tin dichloride, and 1:1 Harada complex of a dialkyl tin dicarboxylate and a dialkyl tin oxide catalyst.

20. The method of claim 10, wherein said vehicle is volatile or non-volatile.

21. The method of claim 10, wherein said non-volatile vehicle is curable with heat or amine.

22. The method of claim 10, wherein said non-volatile vehicle is not curable with heat or amine.

23. The method of claim 11, wherein said vehicle is a polyether polyol.

24. The method of claim 12, wherein said vehicle is one or more of diisobutyl adipate and diisooctyl adipate.

25. In a catalyst system of a tin or bismuth catalyst complexed with a molar excess of a mercapto compound which complex is dispersed in an organic vehicle, the improvement for maintaining said catalyst complex upon extended storage thereof which comprises said vehicle being restricted to a non-carbonyl vehicle that will not react with said mercapto compound upon extended storage of said catalyst system.

26. The catalyst system of claim 25, wherein said non-carbonyl vehicle is one or more of an aromatic hydrocarbon or a terpene.

27. The catalyst system of claim 26, wherein said non-carbonyl vehicle is one or more of toluene, xylene, turpentine, d-limonene, or aromatic petroleum distillates.

28. The catalyst system of claim 25, wherein said tin catalyst is one or more of di-alkyl tin carboxylates, tin mercaptides, stannic oxide, stannous chloride, stannic chloride, tetra-phenyl tin, tetra-butyl tin, dimethyl tin dichloride, and 1:1 Harada complex of a dialkyl tin dicarboxylate and a dialkyl tin oxide catalyst.

29. The catalyst system of claim 25, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

30. The catalyst system of claim 29, wherein said tin catalyst is one or more of di-alkyl tin carboxylates, tin mercaptides, stannic oxide, stannous chloride, stannic chloride, tetra-phenyl tin, tetra-butyl tin, dimethyl tin dichloride, and 1:1 Harada complex of a dialkyl tin dicarboxylate and a dialkyl tin oxide catalyst; and said non-carbonyl vehicle is one or more of an aromatic hydrocarbon or a terpene.

31. The catalyst system of claim 30, wherein said non-carbonyl vehicle is one or more of toluene, xylene, turpentine, d-limonene, or aromatic petroleum distillates.

32. The catalyst system of claim 25, admixed with a polyisocyanate.

33. The catalyst system of claim 32, further admixed with a polyol.

34. The catalyst system of claim 25, wherein said vehicle is volatile or non-volatile.

35. The catalyst system of claim 34, wherein said non-volatile vehicle is curable with heat or amine.

36. The catalyst system of claim 34, wherein said non-volatile vehicle is not curable with heat or amine.

37. The catalyst system of claim 35, wherein said vehicle is a polyether polyol.

38. The catalyst system of claim 36, wherein said vehicle is one or more of diisobutyl adipate and diisooctyl adipate.

39. A method for improving the storage stability of a tin or bismuth catalyst complexed with a molar excess of a mercapto compound which complex is dispersed in an organic vehicle, the improvement which comprises restricting said vehicle to a non-carbonyl vehicle that will not react with said mercapto compound upon extended storage of said catalyst complex.

40. The method of claim 39, wherein said catalyst complex is dispersed in said non-carbonyl vehicle which is one or more of an aromatic hydrocarbon or a terpene.

41. The method of claim 40, wherein said catalyst complex is dispersed in said non-carbonyl vehicle which is one or more of toluene, xylene, turpentine, d-limonene, or aromatic petroleum distillates.

42. The method of claim 39, wherein said tin catalyst is one or more of dialkyl tin carboxylates, tin mercaptides, stannic oxide, stannous chloride, stannic chloride, tetra-phenyl tin, tetra-butyl tin, dimethyl tin dichloride, and 1:1 Harada complex of a dialkyl tin dicarboxylate and a dialkyl tin oxide catalyst.

43. The method of claim 39, wherein said mercapto compound is one or more of trimethylol propane tri-(3-mercapto propionate), pentaerythritol tetra-(3-mercapto propionate, glycol di-(3-mercapto propionate)glycol dimercapto acetate, trimethylol propane trithioglycolate, mercapto diethyl ether, ethane dithiol, thiolactic acid, mercapto propionic acid and carboxyl esters thereof, thiophenol, thio acetic acid, 2-mercapto ethanol, 1,4-butanedithiol, 2-3-dimercapto propanol, toluene-3,4-dithiol, alpha, alpah'-dimercapto-para-xylene, thiosalicylic acid, mercapto acetic acid, dodecane dithiol, didodecane dithiol, dithio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,4,5-tetrafluorothiophenol, cyclohexyl mercaptan, methylthioglycolate, mercapto pyridines, dithioerythritol, 6-ethoxy-2-mercaptobenzothiazole, d-limonene dimercaptan, and 2,3-dithioglycerine.

44. The method of claim 43, wherein said tin catalyst is one or more of dialkyl tin carboxylates, tin mercaptides, stannic oxide, stannous chloride, stannic chloride, tetraphenyl tin, tetra-butyl tin, dimethyl tin dichloride, and 1:1 Harada complex of a dialkyl tin dicarboxylate and a dialkyl tin oxide catalyst; and said non-carbonyl vehicle is one or more of an aromatic hydrocarbon or a terpene.

45. The method of claim 44, wherein said non-carbonyl vehicle is one or more of toluene, xylene, turpentine, d-limonene, or aromatic petroleum distillates.

46. The method of claim 39, wherein said catalyst complex is admixed with a polyisocyanate.

47. The method of claim 46, wherein said catalyst complex and polyisocyanate are further admixed with a polyol.

48. The method of claim 39, wherein said vehicle is volatile or non-volatile.

49. The method of claim 48, wherein said non-volatile vehicle is curable with heat or amine.

50. The method of claim 48, wherein said non-volatile vehicle is not curable with heat or amine.

51. The method of claim 49, wherein said vehicle is a polyether polyol.

52. The method of claim 50, wherein said vehicle is one or more of diisobutyl adipate and diisooctyl adipate.

* * * * *